United States Patent Office 3,636,199
Patented Jan. 18, 1972

3,636,199
SYNTHETIC BOARD INLAID WITH MOISTURE-CURE URETHANE AND METHOD THEREFOR
Theodore E. Jenks, Hopewell, Va., and Edward R. Bittner, Carteret, N.J., assignors to Allied Chemical Corporation, New York, N.Y., and Essex Chemical Corporation, Clifton, N.J., fractional part interest to each
No Drawing. Filed Feb. 4, 1969, Ser. No. 796,576
Int. Cl. B29c *19/20;* B29j *5/60;* B32b *27/40*
U.S. Cl. 264—134          8 Claims

ABSTRACT OF THE DISCLOSURE

Production of synthetic boards inlaid with moisture-cure urethane compositions by compressing cellulosic material and resin binder containing moisture at a temperature within the range of 60–100° F. to form a synthetic board substrate. A moisture-cure urethane coating composition having free-isocyanate groups is applied to the synthetic board substrate which is then compressed at a temperature above 200° F. for at least 1 minute.

CROSS-REFERENCE TO RELATED APPLICATIONS

This application relates to U.S. application Ser. No. 406,550, filed Oct. 26, 1964, now U.S. Pat. 3,389,008, which is directed to a process for producing synthetic board coated with moisture-cure urethane coating compositions. Broadly, the process comprises compressing cellulosic material and resin binder containing moisture at a temperature above 200° F. to form a cured synthetic board substrate. The synthetic board substrate is then maintained at a temperature of at least 100° F., while a moisture-cure urethane coating composition having free isocyanate groups is applied to the board.

BACKGROUND OF THE INVENTION

This invention relates to a process for producing synthetic boards and in particular to a process for producing synthetic boards inlaid with moisture-cure urethane compositions.

The term synthetic board, as used herein, is intended to refer to a fiberboard and particle board. Such products, as is well known, are manufactured in sheets of more or less intricate shapes from fibers, platelets or splinters of wood or other ligno-cellulosic materials, bonded together with a synthetic resin binder. Although wood particles are usually used, other ligno-cellulosic materials such as flax, bagasse, lemon grass, straw and the like have been processed in this manner also. The resin adhesives commonly used are preferably fast curing thermosetting synthetic resins, such as urea-formaldehyde and urea-melamine-formaldehyde resins, often called amino adhesives.

The known processes of forming synthetic board generally include the steps of admixing the wood particles (or fibers) with the resins binder and thereafter forming a mat of the mixture. The mat is placed in a suitable forming device wherein the particles are pressed into the desired shape and, by means of heat, caused to adhere due to the curing of the resin present in the mat. Moisture present in the wood and formed during the curing of the resin is expressed from the board, assisted by the heat and pressure. During the curing step, the resin flows between the wood particles developing an intimate bond among the particles and on curing provides the rigidity and strength desired in the finished board. After removal from the forming device, which may be a hydraulic press or an extrusion means, the hot board may be subjected to a further treatment such as humidification, sanding, etc. Thereafter, the treated board is often finished using either lacquers or various paint coatings.

The use of lacquers and various paint coatings on the synthetic board substrate is subject to one or more disadvantages. For example, many of such coatings are sensitive to moisture, and hence to prevent blooming or lack of adhesion, it is essential that the coating be applied to a cured, cool board. Many paints require relatively long dry times and hence require drying ovens or large areas for storage of the freshly painted board. Also, coatings which comprise volatile organic solvents must be applied to the cold substrate to avoid the danger of blistering and poor adhesion. Thus, means for cooling the synthetic board rapidly, or provision of storage space must be provided. Accordingly, the finishing of synthetic board has been a costly and time consuming operation.

It is one object of the present invention to provide an improved process for producing coated synthetic board.

It is another object of the present invention to provide a simple and economical process for producing synthetic board inlaid with moisture-cure urethane compositions.

It is an additional object of the present invention to produce an inlaid coated synthetic board having superior durability, impact resistance, and high-quality finish.

SUMMARY OF THE INVENTION

Broadly, in accordance with the present invention, synthetic boards inlaid with moisture-cure urethane coating compositions are produced by compressing cellulosic material and adhesive resin binder containing moisture at a temperature within the range of 60–100° F. to form a preformed mat or synthetic board substrate. A moisture-cure urethane coating compositions having free isocyanate groups is then applied to the synthetic board substrate. Finally, the synthetic board substrate is compressed at a temperature above 200° F. for at least one minute.

Specifically, the invention is concerned with a surprisingly effective and economical process for finishing synthetic boards and related products. In this process, particulated cellulosic material treated with an amino or other adhesive is utilized to provide a cold-pressed mat of unformed board. The surface of this cold-pressed mat is sprayed with a moisture-cure urethane composition; thereafter the urethane-type coating is cured at the same time as the amino or other adhesive and inlaid therewith. This coating becomes an integral part of the base material rather than an adhering film. The term "inlay coating" is used herein to connote a coating having at least one surface which is dispersed within one surface of a substrate thereby resulting in a coating set into the body of the substrate surface, thus distinguishing the coating from conventional overlay or sprayed on coatings.

DESCRIPTION OF THE PREFERRED EMBODIMENT

The synthetic board can be a particle board, substrate or a fiber board substrate depending on whether particulate or fibrous material is used in its preparation. Ligno-cellulosic material is commonly used together with a resin binder in conventional preparations of the synthetic board substrate. As has been pointed out previously, binders such as fast-curing thermosetting synthetic resins e.g. urea-formaldehyde, urea-melamine-formaldehyde, and phenol-formaldehyde resins are preferred. In particular an aqueous nonresinous urea-formaldehyde reaction product such as that produced by the process illustrated in U.S. Pat. 2,652,377 may be used to make a superior adhesive. Upon mixing this reaction product with urea, melamine, water, ammonium sulfate, and paraffin wax emulsion and thereafter heating the mixture, the desired resin binder is formed.

The substrate is prepared by compressing a mixture of cellulosic material and resin binder generally at a temperature range of 60–100° F. and at a pressure above 200 p.s.i. for at least 10 seconds. Preferably the mixture is maintained at a room temperature (about 70–90° F.) and at a pressure of about 800–1200 p.s.i. for 15–25 seconds. Under this treatment the binder in the substrate is essentially uncured.

The cellulosic material and resin binder mixture can have a moisture content of generally 0.5–15% of the total weight of substrate ingredients and preferably 0.5–7%. During the application of pressure in the initial formation of the substrate moisture exudes therefrom and may continue to exude after the compression is terminated. This moisture is part of the natural content of the ligno-cellulosic or other cellulosic material and the resin binder.

A moisture-cure urethane coating composition which contains free isocyanate groups and preferably has a free level of —NCO functionality between 1–15% is used to coat the essentially uncured synthetic board substrate. Generally, the board substrate is coated with at least 0.5 mils of the moisture-cure urethane, preferably 0.5–10 mils. Immediately after the board substrate has been covered with the moisture-cure urethane coating, the board substrate is compressed and heated generally at a pressure above about 600 p.s.i. and at a temperature above 200° F. for at least 1 minute. Preferably the synthetic board substrate is compressed and heated generally at a pressure of about 600–900 p.s.i. and at a temperautre within the range of 200–450° F. for 3–5 minutes.

Urethane coating compositions which contain free isocyanate groups, usually at terminal positions of the polymer chain, are well known in the coating art (e.g., see Saunders: Polyurethanes, Chemistry and Technology II, Technology High Polymers, volume XVI, Interscience, 1964, page 477). Such compositions are derived from prepolymers prepared by reaction of polyols, such as polyether polyols; vegetable oils, such as castor oil; or polyesters with organic polyisocyanates, the latter component being used in excess. The curing is accomplished by reaction of the free isocyanate groups with the moisture.

Coating materials suitable for the technique stated above fall within a class of materials for which the vehicle is principally a moisture-cure urethane polymer. These polymers are the reaction product of a polyol (functional groups are —NCO) and a polyisocyanate (functional groups are —NCO).

Specifically, the coatings utilized were obtained as result of reacting toluene diisocyanate with a combination of polyether diols and triols in a ratio to encompass a free level of NCO functionality between 1–15% based on the weight of the moisture-cure urethane composition.

Cure times of these coatings vary with temperature, moisture, and the type and concentration level of catalyst. Tertiary amines, organic tin complexes, and heavy metals are types of catalysts which were employed to promote faster rates of cure. Catalyst concentration levels vary from zero parts to four parts by weight on one hundred parts of urethane polymer.

The surface of the mat of unformed board comprising cellulosic material treated with amino adhesive may be sprayed with moisture-cure urethane immediately upon its removal from the forming device or after the mats have been trimmed to any desired dimension. These operations, especially when conducted on a production line basis, are usually accomplished within minutes of the time the mat is removed from the forming device. The thickness of the coatings applied can be varied over a considerable range. For example, the thickness can be as little as 0.4 mil or as much as 10 mils or more. Several coats rapidly applied as by "cross hatching" are usually preferred, to insure complete coverage. As will be evident to those skilled in this art, the curing time of the applied coating will increase as the thickness of the coating increases, but in all instances the characteristics of the coatings applied in accordance with this invention are surprisingly superior to coatings applied by prior art procedures.

The synthetic board thus obtained is tack-free as soon as it is removed from the compression means and possesses a hard, clear surface. The moisture-cure urethane coating becomes an integral part of the board substrate, i.e. it is inlaid in the substrate, thereby precluding any adverse adhesion effects. Microscopic examination of the board showed relatively fewer pin-holes and craters than the surfae of a moisture-cure urethane coating applied by other processes, particularly those processes concerned with coating a fully cured substrate.

The rapid curing of the urethane coatings to a tack-free state result in substantial economic benefits. For example, the coated boards can be handled and stored in a matter of minutes after finishing, thereby reducing to a practical minimum the space required for processing the boards. Also, curing ovens and drying racks are not necessary, since the boards can be removed from the finishing line and stacked in the storage area immediately after the second compression of the synthetic board.

While it is not certain as to why or how the invention operates, it would seem that the constituents of the unformed board, under influence of elevated temperatures and pressures, in some manner combine to effect the curing properties of the moisture-cure urethane coating. In the formation of these inlay coatings the presence of curing amino resin provides an essential function over and above the moisture supplied. It is believed that the application of the coating composition comprising free isocyanate groups to a substrate containing particulated cellulose and uncured synthetic resin binder induces a beneficial amount of cross-linking between the isocyanate and the wood binder, which is greater than probably occurs when the coating is applied to a pressed synthetic board. This higher degree of cross-linking may cause, in part, a more thorough and a more rapid cure and thus be responsible for the better performance characteristics of the urethane coatings obtained in accordance with the present invention.

As indicated above, the moisture-cured urethane coating compositions utilized in the present invention are well known products. They usually contain an isocyanate terminated prepolymer derived from a polyol and an organic diisocyanate which prepolymer is dissolved in an anhydrous low boiling organic solvent, e.g., toluene, xylene, ethyl acetate, and the like as well as mixtures of said solvents. The composition may contain adjuvants such as UV absorbers, viscosity control agents and the like. The compositions are available both as clear varnishes or as pigmented coatings. In the latter instance, the pigments used are usually inorganic and free from moisture. The compositions contain free isocyanate groups usually within the range of from 1% to 15% based on the weight of the urethane composition. The total solids content of these compositions may vary considerably depending upon the manner of application to be used. Thus, compositions intended for application by spray gun may contain from about 50% to 80% total solids. Compositions intended for application by brushing may contain from about 30% by weight to about 60% total solids. Compositions intended for application by spray gun technique are preferred in the present instance.

The unique properties of moisture-cure urethane coatings in the presence of amino binders is demonstrated further by tests which show the mixture containing the binder or the binder to be an effective press release agent for the inlay coatings. It is superior to silicones, but inferior to polyethylene wax, which was the best press release agent found.

The following examples are given below as illustrative of the preferred embodiment of the invention and are not intended to limit the invention in any way. Parts and percentages were by weight and temperatures are given in degrees Fahrenheit.

Example 1

The synthetic amino resin binder used in this experiment was obtained from 4,000 parts of aqueous nonresinous urea-formaldehyde reaction product having about 85% total solids a mol ratio of about 4.8 mols of formaldehyde per mol of urea and a pH of at least 7.0, prepared as described in U.S. Pat. 2,652,377 by mixing the following:

780 parts of urea;
1,240 parts of melamine;
875 parts of water;
40 parts of ammonium sulfate; and
670 parts of paraffin wax emulsion available under the trade designation of Paracol wax.

This mixture was heated at 159° F. for 12 minutes.

About 1,340 parts of this synthetic resin binder was sprayed onto 5,500 parts of alder fiber in a conventional blender. The spray time was four minutes. The resultant mixture contained 15% resin solids and 1% paraffin wax to impart moisture resistant characteristics to the finished board. The moisture content of the alder furnish before addition of binder system was 4.5%, and 9.6% thereafter. The binder-wood fiber mixture was passed through a single disc Bauer mill to form a well mixed, treated furnish.

A 12-inch by 16-inch mat was formed using 830 parts of treated furnish. The mat was then placed in a press equipped with electrically heated platens which were not heated in this step. The mat was compressed with the platens at room temperature for about 15 seconds at 1,000 p.s.i. pressure. When pressure was released the mat expanded to about one inch thickess but was still handleable. The preformed mat was trimmed to 12 inches by 16 inches.

The preformed mat was then sprayed with about 2-3 mils of moisture-cure urethane and allowed to air cure for 20 minutes. A Teflon coated aluminum caul was placed on the mat with Teflon coating contacting the sprayed surface. The assembly was placed in the press described above and cured for 3 minutes at 350° F. under 750 p.s.i. A high quality board and coating were produced with no sticking to the Teflon-faced caul which had not been treated with a mold release agent. The appearance of the coating was excellent.

The urethane coating composition used in this experiment was a commercially available low gloss pigmented moisture-cure urethane coating composition containing 65.2% total solids, of which 18.1% was lead chromate and 17.7% was siliceous material and contained 2.58% free isocyanate groups.

Tests and observations show that the coating had exceptional properties. Thus, the coating showed no change in appearance after Weather-Ometer exposure equivalent to 2 years. The coating became an integral part of the substrate so that there was no problem relating to adhesion, as with paper overlays. Microscopic examination of the board showed fewer pinholes and craters than the surface of a moisture-cure urethane coating applied by conventional processes.

Example 2

A preformed mat of alder fiber and amino resin was prepared in a similar manner to that described above. The Teflon coated aluminum caul was heated to 350° F. and spray coated with a 2.6-mil thickness of the moisture-cure urethane. This was immediately placed on the preformed mat and cured under the same conditions cited above. A board with a coating of excellent appearance was produced. This shows that it is not necessary to air cure the urethane coating.

Example 3

Coated boards were prepared in a particle board pilot plant by a process essentially the same as described in Example 1 except that high frequency heating was used in the press.

In this experiment an amino resin binder was prepared substantially as described in Example 1 except that water was substitued for wax emulsion in the formulation. Mixed hardwood fibers were sprayed with 2% wax solids from a paraffin wax emulsion, and with sufficient binder to give 12% resin solids. A 36-inch by 36-inch mat was formed from the binder-wood fiber mixture and pressed in a cold press to density of 40 to 45 pounds per cubic foot for about 20 seconds. Pressure was released and the preformed mat was sprayed with a 2.5-mil coating of yellow pigmented moisture-cure urethane. The coated face of the preformed mat was immediately covered with a sheet of ¼-inch thick Teflon gasket material and placed in hot press and pressed to 40-45 pounds per cubic foot density. Cure time was 52 seconds to get steam plus 20 seconds, to give about 72 seconds total cure time after reaching the press stops. The fiberboard produced met quality specifications and the coating appeared excellent.

The illustrations of the method that constitutes the invention given above are not intended to limit the invention in any way but are merely descriptive of the method. All modifications which fall within the spirit of the present invention are claimed as part of the present invention.

We claim:

1. A process of producing synthetic boards inlaid with moisture-cure urethane coating compositions and having superior smoothness, durability, and impact resistance comprising
    (a) compressing cellulosic material and a thermosetting resin binder containing moisture selected from the group consisting of an amino-formaldehyde resin and a phenolic-formaldehyde resin at a temperature within the range of 60–100° F. to form an uncured synthetic board substrate;
    (b) applying a moisture-cure urethane coating composition having free isocyanate groups to the uncured synthetic board substrate; and
    (c) compressing said coated synthetic board substrate at a temperature above 200° F. for at least 1 minute.

2. The process of claim 1 wherein the resin binder is an aqueous urea-formaldehyde adhesive.

3. The process of claim 1 wherein cellulosic material and resin binder are compressed for at least 10 seconds, at about a pressure above 200 p.s.i., and at a temperature within the range of 70–90° F.

4. The process of claim 1 wherein the moisture content of the mixture of the cellulosic material and resin binder mixture may vary from 0.5 to 15% by weight of the total weight of the synthetic board ingredients.

5. The process of claim 1 wherein the moisture-cure urethane coating composition contains a free level of NCO groups of between 1–15% by weight.

6. The process of claim 1 wherein the urethane coated synthetic board substrate is compressed for 3–5 minutes at a pressure of 600–900 p.s.i., and at a temperature within the range of 200–450° F.

7. The process of claim 1 which further includes an air cure of the moisture-cure urethane coating prior to the compressing of the synthetic board substrate.

8. A process of producing synthetic boards inlaid with moisture-cure urethane compositions and having superior smoothness, durability, and impact resistance comprising
    (a) compressing a mixture of cellulosic material and an aqueous urea-formaldehyde adhesive having a total water content of from about 0.5–7% for 15–25 seconds, at about a pressure of 800–1200 p.s.i., and at a tempreature within the range of 60–90° F. to form an uncured substrate;
    (b) applying to said substrate a 0.5–10 mils coating of a moisture-cure urethane composition which contains a free level of NCO groups of between 1–15% by weight; and (c) compressing the coated synthetic board substrate for 3–5 minutes at a pressure of 600–900 p.s.i. and at a temperature within the range of 200–450° F. to provide an inlaid synthetic board.

References Cited

UNITED STATES PATENTS

| | | | |
|---|---|---|---|
| 2,964,792 | 12/1960 | Yan et al. | 161—262 |
| 3,194,793 | 7/1965 | Kogan | 117—148 X |
| 3,310,533 | 3/1967 | McElroy | 117—148 X |
| 3,354,100 | 11/1967 | Kuryla | 117—148 X |
| 3,356,650 | 12/1967 | McElroy | 117—148 X |
| 3,389,008 | 6/1968 | Bailey | 117—57 |
| 3,406,134 | 10/1968 | Sweiwert et al. | 117—148 X |
| 3,440,189 | 4/1969 | Sharp | 161—190 |

JOHN T. GOOLKASIAN, Primary Examiner

C. B. COSBY, Assistant Examiner

U.S. Cl. X.R.

117—57, 60, 65.2; 156—242, 62.2, 245, 280, 231, 335; 161—170, 190, 262; 264—255